US011918045B2

(12) United States Patent
Hijma et al.

(10) Patent No.: US 11,918,045 B2
(45) Date of Patent: Mar. 5, 2024

(54) ELECTRONIC CIGARETTE WITH OPTIMISED VAPORISATION

(71) Applicant: JT International S.A., Geneva (CH)

(72) Inventors: Herman Hijma, Kampen (NL); Kyle Adair, Lisburn Antrim (GB)

(73) Assignee: JT International S.A. (CH)

(*) Notice: Subject to any disclaimer, the term of this patent is extended or adjusted under 35 U.S.C. 154(b) by 689 days.

(21) Appl. No.: 17/049,823

(22) PCT Filed: Apr. 24, 2019

(86) PCT No.: PCT/EP2019/060541
§ 371 (c)(1),
(2) Date: Oct. 22, 2020

(87) PCT Pub. No.: WO2019/207011
PCT Pub. Date: Oct. 31, 2019

(65) Prior Publication Data
US 2021/0227882 A1 Jul. 29, 2021

(30) Foreign Application Priority Data
Apr. 24, 2018 (EP) .................................... 18169009

(51) Int. Cl.
*A24F 40/40* (2020.01)
*A24F 40/42* (2020.01)
(Continued)

(52) U.S. Cl.
CPC .............. *A24F 40/40* (2020.01); *A24F 40/42* (2020.01); *A24F 40/48* (2020.01); *H05B 1/0297* (2013.01);
(Continued)

(58) Field of Classification Search
CPC .......... A24F 40/40; A24F 40/42; A24F 40/48; A24F 40/10; A24F 40/44; A24F 40/46;
(Continued)

(56) References Cited

U.S. PATENT DOCUMENTS 9,877,516 B2 1/2018 Tucker et al.
10,349,678 B2 7/2019 Chen
(Continued)

FOREIGN PATENT DOCUMENTS

CN 105764366 A 7/2016
CN 205456063 U 8/2016
(Continued)

OTHER PUBLICATIONS

Extended European Search Report including Written Opinion for Application No. EP18169008.2, dated Oct. 18, 2018, pp. 1-7.
(Continued)

*Primary Examiner* — Abdullah A Riyami
*Assistant Examiner* — Nader J Alhawamdeh
(74) *Attorney, Agent, or Firm* — Lerner David LLP

(57) ABSTRACT

A capsule for an electronic cigarette has a first end for engaging with an electronic cigarette device and a second end configured as a mouthpiece portion having a vapor outlet, the capsule further including a liquid store configured to contain a liquid to be vaporized, a vaporizing unit including a heater and a fluid transfer element, the vaporizing unit being arranged within a vaporizing chamber, a main vapor channel extending from the vaporizing chamber to the vapor outlet in the mouthpiece, and a housing enclosing the liquid store and the vaporizing unit, wherein the housing includes inner and outer housings that are assembled together, wherein the liquid store is located in a void in-between the inner and outer housings, wherein a seal is provided between the inner and outer housings, and
(Continued)

wherein the seal has a cross-sectional shape having a cross-sectional height that is larger than a cross-sectional width.

20 Claims, 6 Drawing Sheets

(51) Int. Cl.

| | |
|---|---|
| ***A24F 40/48*** | (2020.01) |
| ***H05B 1/02*** | (2006.01) |
| ***H05B 3/42*** | (2006.01) |
| *A24F 40/10* | (2020.01) |
| *A24F 40/44* | (2020.01) |
| *A24F 40/46* | (2020.01) |

(52) U.S. Cl.
CPC ................ *H05B 3/42* (2013.01); *A24F 40/10* (2020.01); *A24F 40/44* (2020.01); *A24F 40/46* (2020.01)

(58) Field of Classification Search
CPC ....... A24F 7/00; A24F 40/485; H05B 1/0297; H05B 3/42; H05B 3/748
See application file for complete search history.

(56) References Cited

U.S. PATENT DOCUMENTS

| | | | | |
|---|---|---|---|---|
| 10,791,763 | B2 | 10/2020 | Chen | |
| 11,051,550 | B2 | 7/2021 | Lin et al. | |
| 2013/0213419 | A1 | 8/2013 | Tucker et al. | |
| 2013/0298905 | A1 * | 11/2013 | Levin | A24F 40/90<br>128/202.21 |
| 2013/0319436 | A1 | 12/2013 | Liu | |
| 2015/0007836 | A1 | 1/2015 | Li et al. | |
| 2015/0208731 | A1 | 7/2015 | Malamud et al. | |
| 2016/0044963 | A1 | 2/2016 | Saleem | |
| 2016/0073692 | A1 | 3/2016 | Alarcon et al. | |
| 2016/0157522 | A1 | 6/2016 | Zhu | |
| 2016/0157525 | A1 | 6/2016 | Tucker et al. | |
| 2016/0192707 | A1 | 7/2016 | Li et al. | |
| 2016/0213066 | A1 | 7/2016 | Zitzke et al. | |
| 2017/0119061 | A1 | 5/2017 | Li et al. | |
| 2017/0215481 | A1 | 8/2017 | Li et al. | |
| 2017/0295844 | A1 | 10/2017 | Thevenaz et al. | |
| 2018/0000158 | A1 | 1/2018 | Wing et al. | |
| 2018/0020730 | A1 | 1/2018 | Alarcon et al. | |
| 2019/0364972 | A1 | 12/2019 | Lin et al. | |
| 2019/0387800 | A1 | 12/2019 | Lin et al. | |
| 2020/0367556 | A1 | 11/2020 | Lin et al. | |
| 2021/0120873 | A1 * | 4/2021 | Adair | A24F 40/485 |
| 2021/0227882 | A1 * | 7/2021 | Hijma | A24F 40/42 |

FOREIGN PATENT DOCUMENTS

| | | | |
|---|---|---|---|
| CN | 106163305 | A | 11/2016 |
| CN | 106690425 | A | 5/2017 |
| CN | 106820269 | A | 6/2017 |
| CN | 106998812 | A | 8/2017 |
| CN | 107205492 | A | 9/2017 |
| CN | 112004429 | A | 11/2020 |
| EP | 2823720 | A1 | 1/2015 |
| JP | 2016512703 | A | 5/2016 |
| WO | 2016127396 | A1 | 8/2016 |
| WO | 2016145611 | A1 | 9/2016 |
| WO | 2017163052 | A1 | 9/2017 |
| WO | 2017218982 | A1 | 12/2017 |
| WO | 2018050030 | A1 | 3/2018 |
| WO | 2018057957 | A1 | 3/2018 |

OTHER PUBLICATIONS

Extended European Search Report including Written Opinion for Application No. EP18169009.0, dated Oct. 18, 2018, pp. 1-7.
International Search Report including Written Opinion for Application No. PCT/EP2019/060541, dated Aug. 13, 2019, pp. 1-15.
International Search Report including Written Opinion for Application No. PCT/EP2019/060540, dated Aug. 12, 2019, pp. 1-13.
Search Report dated Feb. 17, 2023 from the Office Action for Chinese Application No. 201980027587.6 dated Mar. 1, 2023, pp. 1-3. [See p. 1, categorizing the cited references].

* cited by examiner

ELECTRONIC CIGARETTE WITH OPTIMISED VAPORISATION

CROSS-REFERENCE TO RELATED APPLICATIONS

The present application is a national phase entry under 35 U.S.C. § 371 of International Application No. PCT/EP2019/060541, filed Apr. 24, 2019, published in English, which claims priority to European Application No. 18169009.0 filed Apr. 24, 2018, the disclosures of which are incorporated herein by reference.

FIELD OF INVENTION

The present invention relates to personal vaporizing devices, such as electronic cigarettes. In particular, the invention relates to an electronic cigarette and disposable capsules therefor.

BACKGROUND

Electronic cigarettes are an alternative to conventional cigarettes. Instead of generating a combustion smoke, they vaporize a liquid, which can be inhaled by a user. The liquid typically comprises an aerosol-forming substance, such as glycerin or propylene glycol that creates the vapor. Other common substances in the liquid are nicotine and various flavorings.

The electronic cigarette is a hand-held inhaler system, comprising a mouthpiece section, a liquid store, a power supply unit. Vaporization is achieved by a vaporizer or heater unit which typically comprises a heating element in the form of a heating coil and a fluid transfer element. The vaporization occurs when as the heater heats up the liquid in the wick until the liquid is transformed into vapor. The electronic cigarette may comprise a chamber in the mouthpiece section, which is configured to receive disposable consumables in the form of capsules. Capsules comprising the liquid store and the vaporizer are often referred to as "cartomizers".

A problem with electronic cigarettes is that the heater sometimes heats up the liquid such that part of the liquid is transformed to vapor, while another part are brought into a boiling state. This results in that the unvaporized liquid is transformed into larger projections or droplets of liquid that escapes through the mouthpiece. It can be unpleasant for a user to inhale such large droplets, wherefore different ways of alleviating this problem has been proposed.

In order to alleviate this problem, it is common to provide a mesh in the mouthpiece to prevent larger particles from reaching to the user's mouth. The document US20170215481 shows an example of an electronic cigarette having a mesh which avoids larger droplets of liquid to exit through the mouthpiece.

However, as the desired size of the vapor droplets in the aerosol is very small, a mesh still does not give a satisfactory result. Even if the openings in the mesh are reduced, the associated flow restriction would be increased and a satisfactory flow of vapor from the mouthpiece is difficult to achieve.

SUMMARY

In view of the above-mentioned drawbacks of the prior art, it is an object of the present invention to reduce the formation of droplets in the vapor of an electronic cigarette.

According to a first aspect of the present invention, there is provided a capsule for an electronic cigarette, the capsule having a first end for engaging with an electronic cigarette device and a second end configured as a mouthpiece portion having a vapor outlet, the capsule further comprising: a liquid store configured to contain a liquid to be vaporized, a vaporizing unit comprising a heater and a fluid transfer element, the vaporizing unit being arranged within a vaporizing chamber, a main vapor channel extending from the vaporizing chamber to the vapor outlet in the mouthpiece, and a housing enclosing the liquid store and the vaporizing unit, wherein the fluid transfer element is fluidly connected to the liquid store by at least one liquid inlet and the fluid transfer element provides a capillary action on liquid received therein, wherein the heater is provided at a position that is substantially adjacent the liquid inlet, or at a position between the liquid inlet and the mouthpiece.

Placing the heater at a location which is at a position that is substantially adjacent the liquid inlet or between the liquid inlet and the mouthpiece (and hence generally "above" the liquid inlet when the capsule is in a device and in a "normal" orientation) has the advantage that the amount of liquid around the heater is regulated to an extent by the capillary pressure of the fluid transfer element. In particular, excess quantities of the liquid would tend to form (as a result of a combination of capillary pressure and gravity) within the fluid transfer element below the liquid inlet rather than adjacent thereto or above the liquid inlet.

According to a second aspect of the present invention there is provided a capsule for an electronic cigarette, the capsule having a first end for engaging with an electronic cigarette device and a second end configured as a mouthpiece portion having a vapor outlet, the capsule further comprising: a liquid store configured to contain a liquid to be vaporized, a vaporizing unit comprising a heater and a fluid transfer element, the vaporizing unit being arranged within a vaporizing chamber, a main vapor channel extending from the vaporizing chamber to the vapor outlet in the mouthpiece, and a housing enclosing the liquid store and the vaporizing unit, wherein the housing is composed from an inner housing and an outer housing that are assembled together, wherein the liquid store is located in a void in-between the inner housing and the outer housing, wherein a seal is provided between the inner portion and the outer portion, and wherein the seal has a cross-sectional shape having a cross-sectional height that is larger than a cross-sectional width.

According to a third aspect of the present invention there is provided a capsule for an electronic cigarette, the capsule having a first end for engaging with an electronic cigarette device and a second end configured as a mouthpiece portion having a vapor outlet, the capsule further comprising: a liquid store configured to contain a liquid to be vaporized, a vaporizing unit comprising a heater and a fluid transfer element, the vaporizing unit being arranged within a vaporizing chamber, a main vapor channel extending from the vaporizing chamber to the vapor outlet in the mouthpiece, and a housing enclosing the liquid store and the vaporizing unit, wherein the heater has a height corresponding to 25%-50% of the height of the fluid transfer element, and wherein the convection of the heater is between 4000 and 7000 W/m2K and the power density is between 1.10 to 2.350 Watt/mm2, preferably between 1.220 to 2.320 Watt/mm2, and more preferably between 1.15 to 1.16 Watt/mm2.

Preferably, the fluid transfer element is located within the main vapor channel and has a longitudinal component coinciding with a longitudinal axis of the capsule. In this way, the capillary action on liquid in the fluid transfer element can be towards the mouthpiece, counter-acting the effect of gravity and thereby regulating the flow of liquid from the liquid store to the fluid transfer element. The fluid transfer element can use capillary action to couple liquid away from the liquid inlet. The heater is provided above or adjacent the liquid inlet, and therefore the heater can vaporize liquid that travels within the fluid transfer element using capillary effects. The capillary action can act in the opposite direction to gravity, and this can limit the amount of liquid that is present in the fluid transfer element. This can allow efficient vaporisation of the liquid, and can prevent vaporisation of a saturated fluid transfer element, which may generate unvaporized droplets to the airflow.

Preferably the fluid transfer element is fluidly connected to the liquid store by the at least one liquid inlet, and the external surface of the tubular fluid transfer element abuts the at least one liquid inlet and the internal surface of the tubular fluid transfer element is in contact with the heater.

The liquid inlet may be provided at the bottom of the fluid transfer element, in normal use, at a distance of 0-1 mm from the bottom of the fluid transfer element. The liquid inlets may have a diameter of between 0.8 to 1.3 mm, preferably between 0.95 and 1.15 and more preferably between 1.03 and 1.14 mm. Providing the liquid inlets at the bottom of the fluid transfer element forces the liquid to rise in the fluid transfer element by capillary action. This causes a controlled liquid supply to the heater regardless of the amount of liquid in the liquid store.

The housing preferably comprises an inner housing and an outer housing that are assembled together. The vaporizing chamber is preferably located substantially within the inner portion and the liquid store is preferably located in a void in-between the inner housing and the outer housing. The inner housing and the outer housing may be assembled using a first joint and a second joint, and the second joint may be located radially inwardly of the first joint. The second joint may enable a movement between the inner housing and the outer housing in the axial direction of the capsule such that the relative axial position of the inner housing and the outer housing can be varied.

The inner housing may have a first shoulder and a second shoulder defining a groove there-between. The outer housing may have a protrusion, and the protrusion may be configured to extend into the groove at a variable depth. Preferably the inner housing and the outer housing are sealed together by a compressible seal having a cross-sectional height that is larger than a cross-sectional width. The seal may be provided in the groove defined in the inner housing and it may have a cross-sectional shape that is oval. In other embodiments the seal may have a cross-sectional shape with a transversal projection, projecting in a direction transverse to the axial compressible direction of the seal. The transversal projection may be configured to seal against the inner housing or the outer housing once a compression threshold has been reached.

Preferably the liquid store is configured to maintain a negative pressure such that the flow is regulated and restricted from flowing freely into the fluid transfer element.

The fluid transfer element may have a hollow tubular shape and the heater may be in the form of a heating coil and arranged radially inward of the fluid transfer element. The capillary height of the fluid transfer element preferably exceeds the axial height of the heating coil. In some embodiments the heating coil has a height corresponding to 25%-50% of the height of the fluid transfer element, preferably 25%-45% or most preferably 35%. The fluid transfer element may have a capillary height corresponding to the actual height of the fluid transfer element. The height of the fluid transfer element may be between 4.5 and 6.5 mm and the height of the heating coil may be 1.8 to 2.5 mm, preferably 5.8 mm and 2.04 mm respectively.

Preferably the convection of the heater is between 4000 and 7000 W/m2K, preferably between 5500 and 6500 W/m2K, and most preferably between 5800 W/m2K and 6200 W/m2K. In this way, it has been found that, due to the latent heat of vaporisation, the energy produced by the heater causes vaporisation in the fluid transfer element and drives the vapour off, rather than raising the temperature of the liquid in the liquid store.

The heater may be a heating coil with a number of turns between 2 to 4, preferably 3 turns. In some embodiments the heating coil may be titanium.

The present invention is based on a realization of the inventors that droplets in the vapor can be reduced by improving the vaporization capabilities of an electronic cigarette. The projections of liquid droplets are often caused when the liquid enters a boiling state instead of a vaporization state. By reducing the boiling effect in the vaporizing chamber and increasing the vaporization capabilities, more liquid can be brought into the vaporization stage.

Each aspect of the invention has the desirable property of reducing the formation of liquid projections. However, if the solutions are used in combination, the effects from the functional group of features is added to each other and synergies can be achieved. Therefore, features of one aspect of the invention can be combined with any other aspect of the invention.

According to an embodiment, there is provided a capsule for an electronic cigarette, the capsule having a first end for engaging with an electronic cigarette device and a second end configured as a mouthpiece portion having a vapor outlet, the capsule further comprising: a liquid store configured to contain a liquid to be vaporized, a vaporizing unit comprising a heater and a fluid transfer element, the vaporizing unit being arranged within a vaporizing chamber, an air inlet or inlets, a main vapor channel in fluid communication with the air inlet or inlets at one end and with the vapor outlet in the mouthpiece at the other end and incorporating the vaporizing chamber, and a housing enclosing the liquid store and the vaporizing unit, wherein the fluid transfer element is fluidly connected to the liquid store by at least one liquid inlet and the fluid transfer element provides a capillary action on liquid received therein, wherein the fluid transfer element extends in a direction along the main vapor channel in one or both directions away from the liquid inlets by an amount which exceeds the extension of the heater along the main vapour channel.

Preferably, the fluid transfer element is configured as a tube, the external surface of which abuts the at least one liquid inlet, and the internal surface of which is in contact with the heater. Preferably the heater is located within the fluid transfer element adjacent to the at least one liquid inlet. In this way, when the fluid transfer element adjacent to the heater becomes dry as a result of liquid to be vaporized being vaporized by the heater, liquid flows by capillary action both radially through the fluid transfer element from the or each liquid inlet and additionally by capillary action (preferably with gravitational assistance if the device is held in a normal usage orientation in some embodiments) axially and/or circumferentially through the fluid transfer element from other portions of the fluid transfer element, thus enabling quick and efficient replenishment of liquid to be vaporized to portions of the fluid transfer element in contact with the heater. This prevents portions of the heater from becoming dry as a result of insufficient replenishment of liquid to portions of the fluid transfer element in contact with the heater element and remote from sources of re-supply of liquid to be vaporized (whether those sources of resupply are (other parts of) the fluid transfer element or the liquid inlet or inlets) without requiring very numerous or large (in terms of surface area) inlets—this is advantageous because using numerous or large inlets can cause problems with leakage of liquid through the fluid transfer element, especially where the fluid transfer element dries out adjacent a liquid inlet (or a portion of a liquid inlet) on one side of the liquid inlet, and the surface of the liquid in the liquid reservoir also falls below the liquid inlet (or portion thereof) on the other side of the liquid inlet, as this can permit air at atmospheric pressure to leak into the liquid reservoir, through the "dry" fluid transfer element and into the space above the surface of the liquid, thus destroying the negative pressure in the space above the liquid surface in the liquid reservoir which can lead to (increased) undesirable leakage of liquid through the fluid transfer element and into the vaporization chamber.

In some embodiments, the heater is provided at a position that is substantially adjacent the liquid inlet. This is advantageous as it minimizes the distance that liquid needs to travel to get from the inlet(s) to the heater. As a result, liquid can travel along different resupply routes to travel to portions of the fluid transfer element in contact with the heater to maximize the efficiency of the liquid resupply. This is in contrast to conventional arrangements in which resupply routes through the fluid transfer element often merge resulting in slower resupply. It will be appreciated that resupply of liquid from other parts of the fluid transfer element which are more remote from the liquid inlet(s) than the heater, will not (contrary to prior art arrangements) tend to be resupplied themselves with liquid from the liquid store until after the portions of the wick adjacent the heater have themselves been resupplied. This arrangement works well in e-cigarettes as there is usually ample time between puffs for liquid to be resupplied to the whole of the fluid transfer element. Thus these remoter areas can act as buffers enabling quick re-supply to certain parts of the wick during a puff, the buffers then being refilled in-between puffs.

BRIEF DESCRIPTION OF THE DRAWINGS

The invention will now be described with reference to the appended drawings, which by way of example illustrate embodiments of the present invention and in which like features are denoted with the same reference numerals, and wherein.

DETAILED DESCRIPTION

As used herein, the term "inhaler" or "electronic cigarette" may include an electronic cigarette configured to deliver an aerosol to a user, including an aerosol for smoking. An aerosol for smoking may refer to an aerosol with particle sizes of 0.5-7 microns. The particle size may be less than 10 or 7 microns. The electronic cigarette may be portable.

Figure 1C:
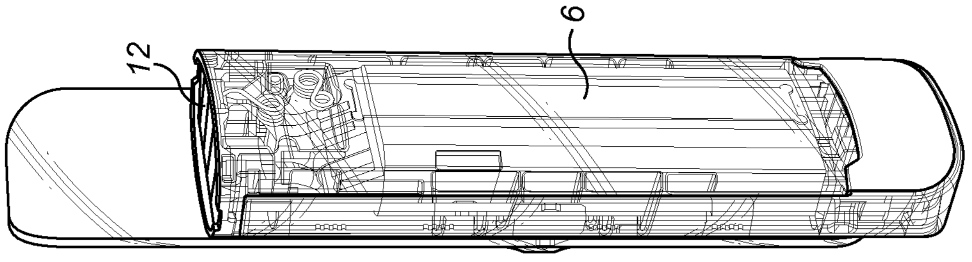
FIG. 1*c* is a schematic perspective view of the inhaler in FIGS. 1*a* and 1*b*, wherein the back panel of the inhaler has been removed.
Figure 1B:
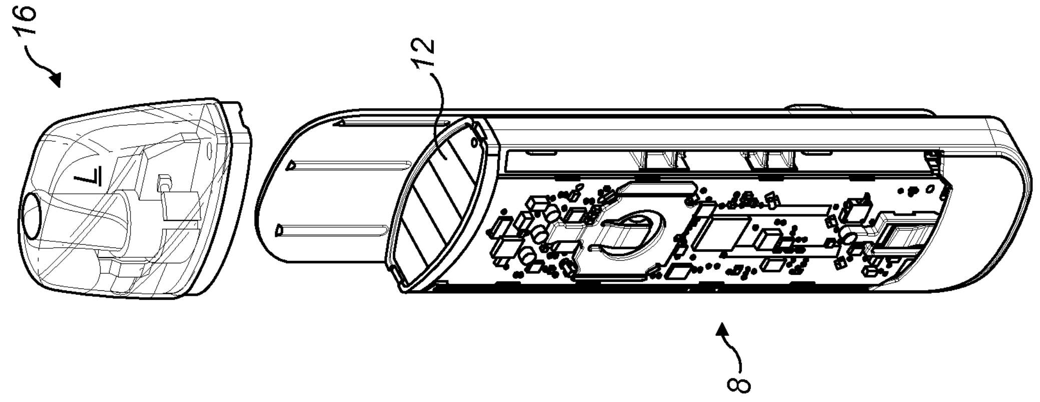
FIG. 1*b* is a schematic perspective view of the inhaler and capsule of FIG. 1*a* and in which the front panel of the inhaler has been removed.
Figure 1A:
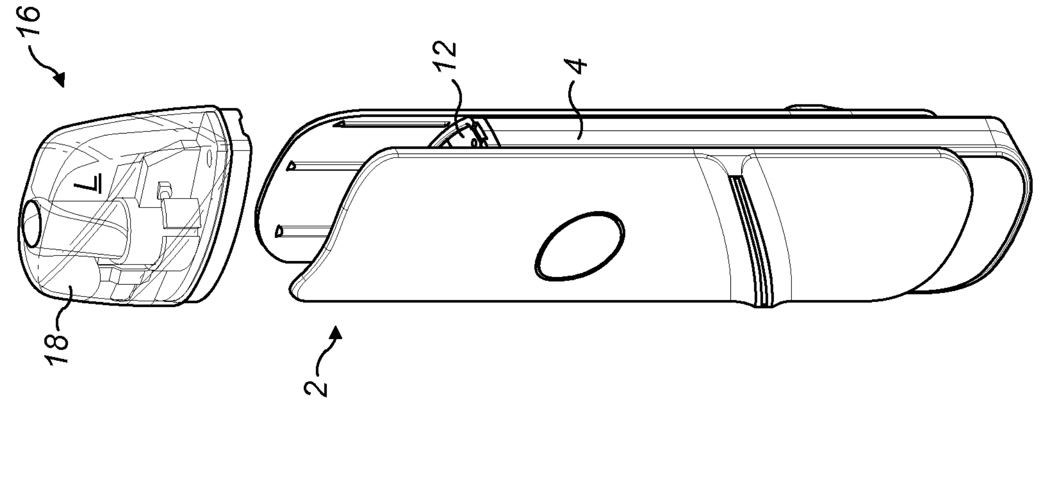
FIG. 1*a* is a schematic perspective view of an inhaler and a capsule according to an exemplary embodiment of the present invention.

Referring to the drawings and in particular to FIGS. 1*a* to 1*c*, an electronic cigarette 2 for vaporizing a liquid L is illustrated. The electronic cigarette 2 can be used as a substitute for a conventional cigarette. The electronic cigarette 2 has a main body 4 comprising a power supply unit 6, electrical circuitry 8 and a capsule seating 12. The capsule seating 12 is configured to receive removable capsules 16 comprising a vaporizing liquid L.

The capsule seating 12 is in the form of a cavity configured to receive the capsule 16. The capsule seating 12 is provided with a connection portion 21 configured to hold the capsule 16 firmly to the capsule seating 12. The connection portion 21 could for instance be an interference fit, a snap fit, a screw fit, a bayoneted fit or a magnetic fit. The capsule seating 12 further comprises a pair of electrical connectors 14 configured to engage with corresponding power terminals 45 on the capsule 16.

Figure 2A:
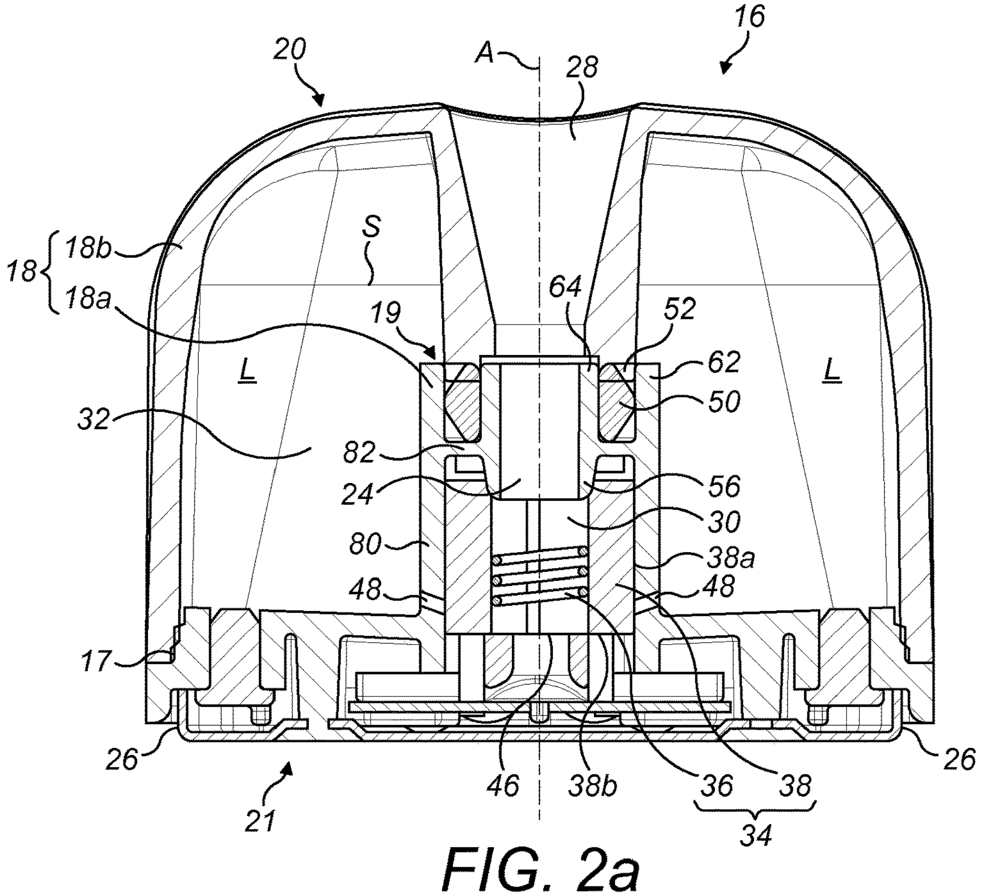
FIG. 2*a* is a schematic front cross-sectional view of a capsule according to an embodiment of the present invention.
Figure 2B:
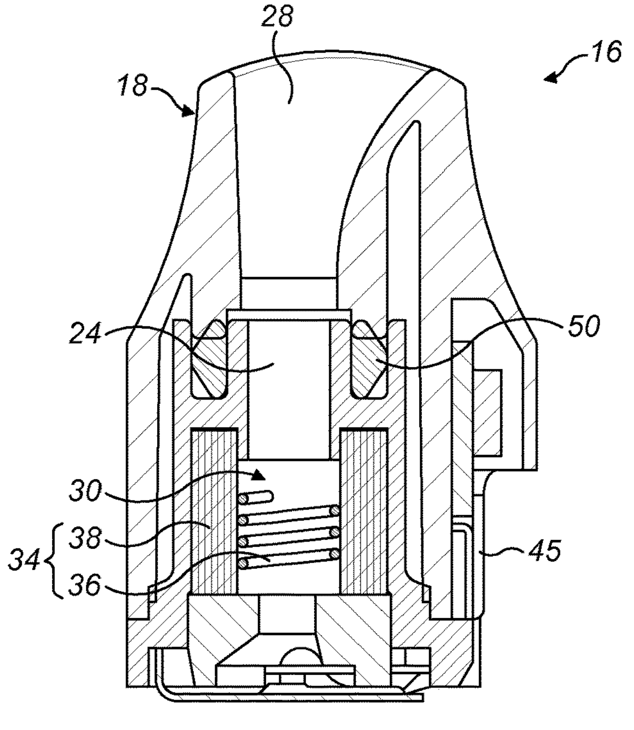
FIG. 2*b* is a schematic side cross-sectional side-view of a capsule according to an embodiment of the present invention.

As best seen in FIGS. 2*a* and 2*b*, the capsule 16 comprises a housing 18, a liquid store 32, a vaporizing unit 34 and power terminals 45. The housing 18 has a mouthpiece portion 20 provided with a vapor outlet 28. The mouthpiece portion 20 may have a tip-shaped form to correspond to the ergonomics of the user's mouth. On the opposite side of mouthpiece portion 20, the connection portion 21 is located. The connection portion 21 is configured to connect with the connector in the capsule seating 12. In the illustrated embodiment of FIGS. 2*a* and 2*b*, the connection portion 21 on the capsule 16 is a metallic plate, configured to connect to a magnetic surface in the capsule seating 12. The capsule housing 18 may be in a transparent material, whereby the liquid level of the capsule 16 is clearly visible to the user. The housing 18 may be formed in a polymeric or plastic material, such as polyester.

The vaporizing unit 34 comprises a heating element 36 and a fluid transfer element 38. The fluid transfer element 38 is configured to transfer the liquid L by capillary action from the liquid store 32 to the heating element 36. The fluid transfer element 38 can be a fibrous or porous element such as a wick made from twined cotton or silica. Alternatively, the fluid transfer element 38 can be any other suitable porous element.

A vaporizing chamber 30 is defined in the area in which liquid vaporization occurs and corresponds to the proximal area in which the heating element 36 and the fluid transfer element 38 are in contact with each other. The fluid transfer element 36 has an upper distal end 38*a* and a lower distal end 38*b*. The lower distal 38*b* end is provided at the lower end of the vaporizing chamber 30. The vaporizing chamber 30 is located at the opposite distal end of the capsule 16 to the mouthpiece portion 20. From the vaporizing chamber 30 to the vapor outlet 28 in the mouthpiece portion 20, a main vapor channel 24 is formed and may have a tubular cross-section. The main vapor channel 24 is thus extending from the vaporizing chamber 30 to the vapor outlet 28 in the mouthpiece portion 20. The vaporizing chamber 30 has a bottom surface 46 arranged opposite of the vapor outlet 28. The bottom surface is a liquid impermeable surface, which closes the vaporization chamber 30.

The liquid L may comprise an aerosol-forming substance such as propylene glycol or glycerol and may contain other substances such as nicotine. The liquid L may also comprise flavorings such as e.g. tobacco, menthol or fruit flavor.

Figure 4A:
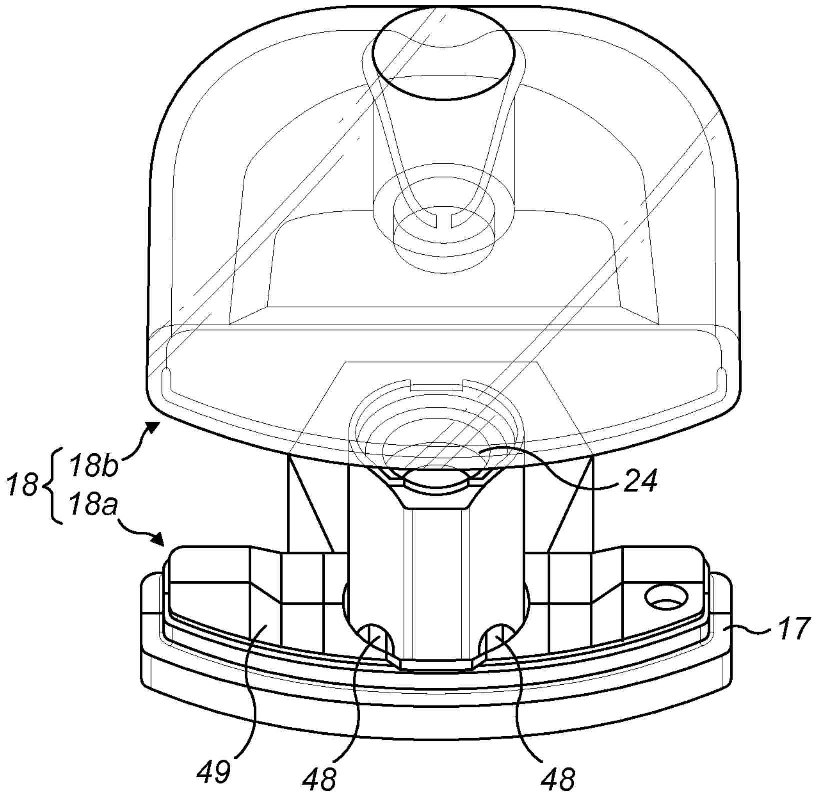
FIG. 4*a* is a schematic exploded view of a capsule of the present invention.
Figure 4B:
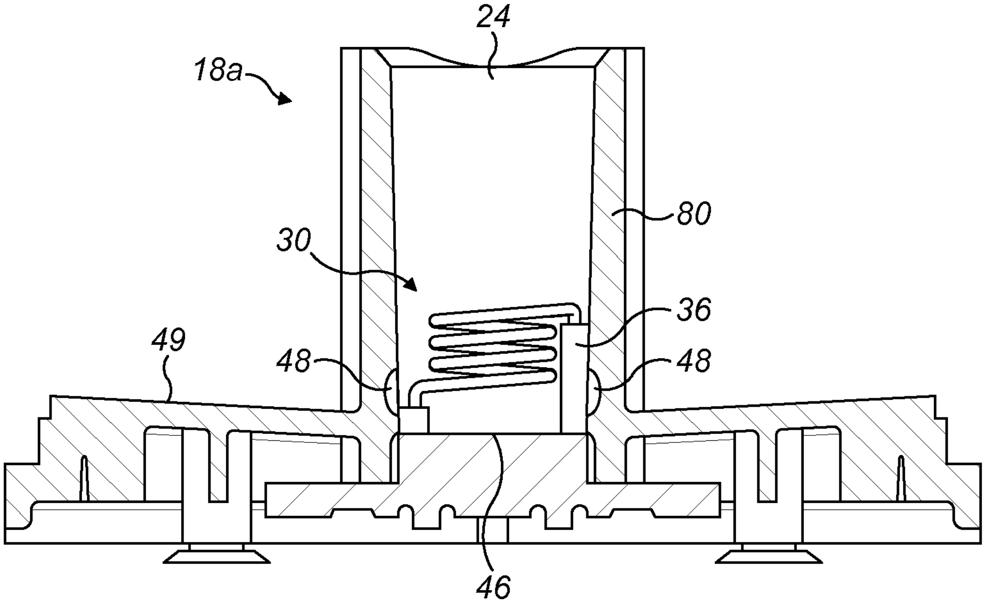
FIG. 4*b* is a schematic cross-sectional view of the inner housing of the capsule of FIG. 3*c*.

As seen in FIGS. 4*a* and 4*b*, the vaporizing chamber 30 is fluidly connected to the liquid store 32 using at least one liquid inlet 48. The liquid inlet 48 is arranged at the bottom surface 46 of the liquid store 32, at a distance of 0 –2 mm above the bottom surface 46, preferably 0-1 mm. The position of the liquid inlets 48 close to the bottom surface 46 of the liquid store 32 avoids liquid L from the liquid store 32 from flowing freely into the vaporization chamber 30. The liquid inlet 48 is also located close to the lower distal end 38*b* of the fluid transfer element 38. The liquid inlets 48 are thus located 1-3 mm from the lower distal end 38*b* of the fluid transfer element 38, preferably 1-2 mm. The heating element 36 is advantageously positioned with its first contact approximately aligned with the liquid opening, that is in line with or 1 mm below the liquid inlets or 1-2 mm above the liquid inlets. Preferably, the heating element 36 is in contact with the fluid transfer element 38. If the liquid L flows freely, there is a risk of oversaturating the fluid transfer element 38. The liquid inlets close to the bottom surface 46 of the liquid store 32 enables a negative pressure to form in the liquid store 32 during vaporization and until the liquid store 32 gets empty. This is because the liquid inlets 48 are positioned vertically underneath the liquid surface S in the capsule 16 until the capsule 16 is close to depletion. The close to depletion can be defined as when the volume of liquid L in the capsule 16 has decreased with 90% from the original volume. This is achieved when the electronic cigarette 2 is in an essentially upright position and thus during normal usage of the electronic cigarette 2.

As illustrated in FIGS. 1*a* and 1*b*, the capsule 16 may have a shape that is not rotationally symmetrical in the axial direction. The capsule 16 may therefore have a rectangular base with flat longer side and a short side. This shape may also correspond to the shape of the electronic cigarette 2. The liquid inlets 48 may advantageously be provided in the short side of the capsule 16. This maintains a negative pressure in the liquid store 32 as the liquid inlets 48 remain below the surface of the liquid surface when the electronic cigarette is in a resting position (lying flat on a surface such as a table). This effect lasts at least until the liquid store 32 is about half-full. Additionally, even when the liquid store 32 is less than half-full, while the fluid transfer element is "wet" it effectively seals against air passing through the fluid transfer element and reducing the negative pressure. Typically, because of gravity, "drying" of the fluid transfer element or wick will start at the top of the wick and only slowly migrate downwards. Therefore even when the liquid store is less than half-full placing the liquid inlets so as to not be located at the top of the fluid transfer element when the electronic cigarette is in a resting position, still assists in maintaining the negative pressure.

The bottom surface 49 of the liquid store 32 may also be provided with a downwardly sloping surface 49 against the at least one liquid inlet 48. The downwardly sloping surface 49 enables all liquid L in the liquid store 32 to be transported towards the liquid inlet 48 and to be further absorbed by the fluid transfer element 38 inside the main channel 24. The capsule 16 is further provided with at least one air intake channel 26 extending from a first opening in the capsule 16, to the vaporizing chamber 30.

Figure 2C:
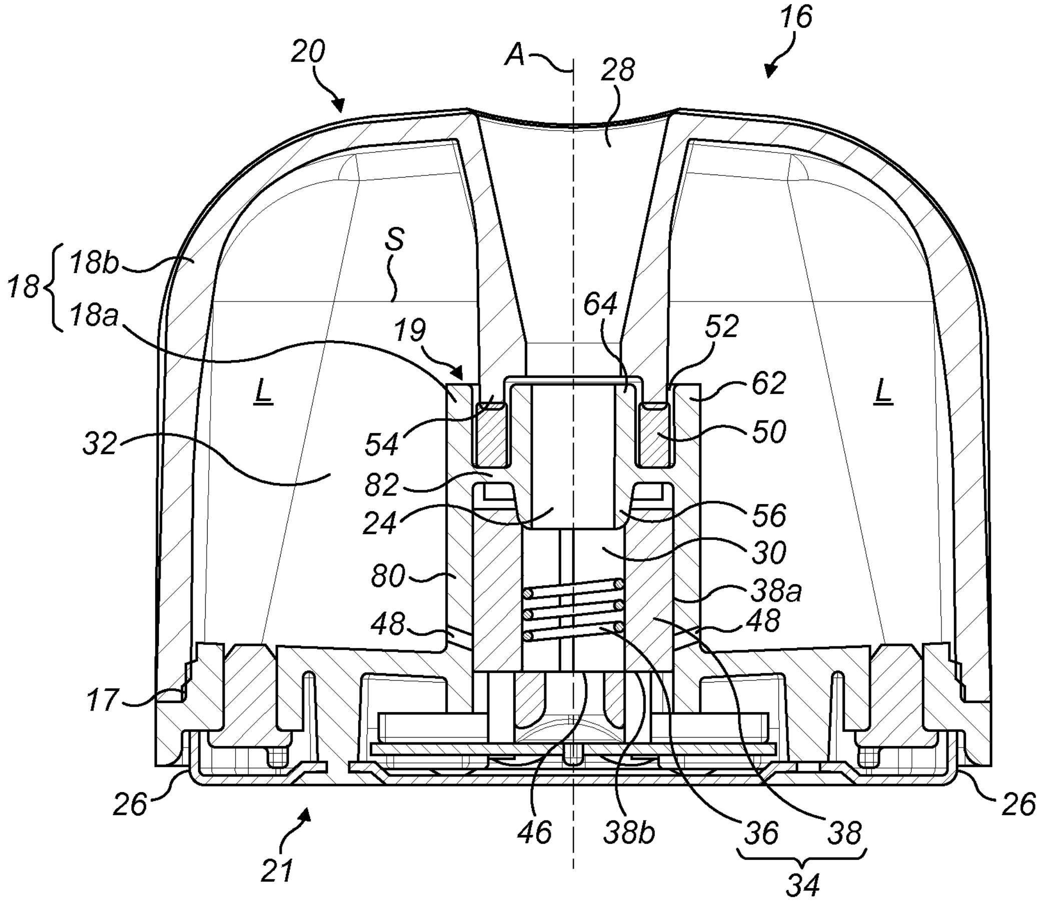
FIG. 2*c* is a schematic side cross-sectional side-view of a capsule according to another embodiment of the present invention.

As best seen in FIGS. 2*a*, 2*c* and 4*a*, the capsule housing 18 may be formed from an inner housing 18*a* and an outer housing 18*b* assembled together with the liquid store 32 located in a void in-between the inner housing 18*a* and the outer housing 18*b*. The inner housing 18*a* and the outer housing 18*b* may be assembled using a first joint 17 and a second joint 19. The first joint 17 is located at the bottom portion of the capsule 16 and may advantageously be achieved by ultrasonic welding.

The second joint 19 is located inside the capsule 16 and can be achieved by a seal 50 housed inside a circular groove 52 in the inner housing 18*a*. The inner housing 18*a* has a first shoulder 62 and a second shoulder 64 defining the groove 52 there-between. The outer housing 18*b* is provided with a projection 54, which is configured to extend into the groove 52 at a variable depth. The projection 54 is arranged to abut against the seal 50. As the seal 50 is compressible in the axial direction A of the capsule 16, the projection 54 may enter the groove 52 at a variable depth.

The inner housing 18*a* is configured to house the vaporizing unit 34, which is located in the main channel 24 extending from the bottom surface 46 of the vaporization chamber 30, as previously described. In order to avoid that the fluid transfer element 38 collapses into the vaporization chamber 30, the inner housing 18*a* may be provided with a flange 56, which is encircling the inner circumference of the fluid transfer element 38.

The inner housing 18*a* comprises a tubular column or chimney 80 extending from the at least one fluid inlet 48 to the first shoulder 62. The tubular column 80 is provided radially outwardly of the fluid transfer element 38 so that it provides structural support to the fluid transfer element 38. The flange 56 that encircles the inner circumference of the fluid transfer element 38 is attached the tubular column by a radial strut 82. In this way, the tubular column 80 can provide structural support to the internal and external surfaces of the tubular fluid transfer element 38.

As may be appreciated from FIG. 2*a* in particular, the first shoulder 62 is provided as part of the tubular column 80. The second shoulder 64 is connected to the tubular column 80 by the radial strut 82 so that the annular groove 52 is defined between the first and second shoulders 62, 64.

An advantage of having the two-part housing 18 comprising the inner housing 18*a* and the outer housing 18*b* is that the assembly of the internal parts of the vaporization unit 34 is facilitated. However, as the capsule 16 is assembled by a first housing 18*a* and the second housing 18*b*, there may be variations in the manufacturing process. The seal 50 is therefore configured to accommodate for variations in the manufacturing process.

Because the inner housing 18*a* and the outer housing 18*b* are sealed together, a negative pressure forms in the liquid store 32 when fluid flows out of the liquid store 32. The negative pressure regulates the liquid flow from the liquid store 32 to the fluid transfer element 38. The negative pressure thus creates a resistance to free flow of liquid L into the vaporization chamber and in that way regulates the liquid flow. The at least one fluid inlet 48 can be provided at the end portion of the heating element 36 in its most proximal point to the base of the capsule 16.

Figure 3A:
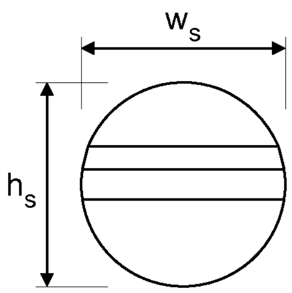
FIGS. 3*a* to 3*d* are cross-sectional views of capsule seals according to embodiments of the present invention.
Figure 3B:
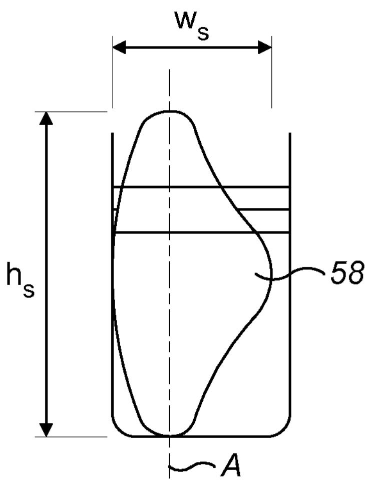
Figure 3C:
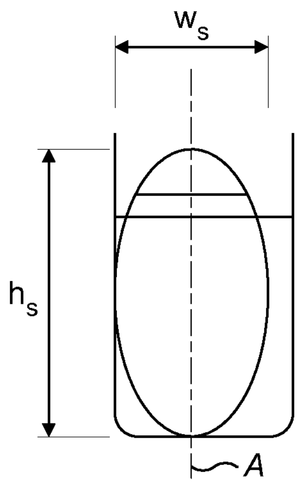
Figure 3D:
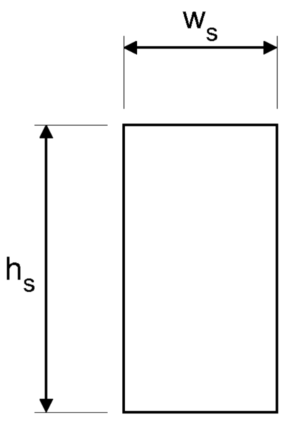

FIG. 3*a* illustrates a conventional O-ring with a circular cross section. The seal 50 of FIG. 3*a* can be used in the capsule 16 according to the present invention. However, as seen in FIGS. 3*b*, 3*c* and 3*d*, the seal 50 may have a cross-sectional height $h_s$ that is larger than the cross-sectional width $w_s$. This provides an advantage of that the seal 50 is configured to accommodate for a longer axial variations between the position of the inner housing 18*a* in relation to the outer housing 18*b*, while maintaining a compact shape in the transverse direction.

In the embodiment illustrated in FIGS. 3*b*, 3*c* and 3*d*, the seal 50 is provided with a non-circular shape, such that the seal is longer in the axial direction (coinciding with the axial direction of the capsule 16). The seal 50 can have a rectangular cross-section as illustrated in FIGS. 2*c* and 3*d*.

In the embodiment illustrated in FIG. 3*b*, in which the seal 50 has a T-shaped form. The T-shape provides the same advantage in terms of the long accommodation for axial differences. As an additional effect, the transversal protrusion 58 enables the seal 50 to additionally seal against the first shoulder 62 and the second shoulder 64.

The long cross-sectional height $h_s$ of the oval and t-shaped seals 50 provides for a long deformation length and a long distance throughout which the seal 50 is capable of sealing the inner housing 18*a* and the outer housing 18*b* against each other. Additionally, the relatively small width of the seal 50 reduces the space of the seal 50 in the horizontal direction such that the size of the capsule 16 and the liquid content L in the liquid store can be optimized.

The O-ring with a circular cross-section provides a sealing effect between the inner housing 18*a* and the outer housing 18*b*. Because of the variations in the ultrasonic welding process, the seal is configured to accommodate a difference of ±0.5 mm. The oval seal and T-shaped seals provide a longer compression distance through which a sealing effect is achieved.

The circular, the oval, the rectangular and the T-shaped seals demonstrate different compression behavior, i.e. the seals present different resistance to an axial deformation force $F_c$. This behavior is related to the geometric differences in the horizontal cross-sectional area and the vertical height of the seals. Hence, the geometric differences translate into different spring constants among the circular, oval and T-shaped seals. The spring constant for the seals also varies in a non-linear manner as the cross-section of the seals present different cross-sectional areas in the axial direction thereof. When the compression force $F_c$ divided by the cross-sectional area, the force distributes over the cross-sectional area and can be measured in Newton/$m^2$.

For the oval in comparison with the seal circular seal, the cross sectional area is smaller in relation to the vertical height. This means that the oval seal has a lower elasticity module than the circular seal and thus acts much more flexible.

The T-shaped seal also has a similar cross-sectional area as the oval seal. However, the T-shaped seal provides for a first region of high compressibility (low spring constant) and a second region over the horizontal T-shaped protrusion with stiffer region (of a higher spring constant). The T-shaped protrusion provides another benefit, which is to in addition seal against a lateral surface.

Now referring to FIGS. 2*a* and 2*b* in which it is illustrated that the fluid transfer element 38 may have a tubular form and have an axial longitudinal direction coinciding with the axial longitudinal direction of the main channel 24. The tubular form provides a vapor channel 40 inside the fluid transfer element 38, through which the vapor can leave the vaporizing chamber 30 to travel to the vapor outlet portion 28. Furthermore, the tubular form of the fluid transfer element 38 also provides a snug fit against the inner wall of the main channel 24 and forms a space therein for receiving the heating element 36.

The heating element 36 may advantageously be in the form of a coil-shaped heater 36 and be aligned with its axial direction coinciding with the longitudinal direction of the fluid transfer element 38. Hence, a coil-shaped heater 36 can be fitted into the vapor channel 40 defined inside the fluid transfer element 38 while providing a close contact with the fluid transfer element 38. In such a way, the fluid transfer element 38 can be retained in-between the inner wall of the main channel 24 and the heating element 36. This also helps the fluid transfer element 38 to maintain its shape and avoid collapsing. The material of the fluid transfer element 38 can be cotton, silica, or any other fibrous or porous material.

The heating element 36 is provided with a height corresponding to a proportion of the capillary height of the fluid transfer element 38. The inventors have found that if the heating element 36 is provided with a height largely exceeding the capillary height of the fluid transfer element 38, the heating element 36 tends to be in contact with a dry top portion of the fluid transfer element 38 as the liquid level in the liquid store 32 becomes depleted. The fluid transfer element 38 in the bottom portion of the capsule 16 is often saturated or even over-saturated with liquid while the upper portion of the fluid transfer element 38 is left dry. If heat is applied to the fluid transfer element 38, the temperature of the heating element 36 at the dry portion of the fluid transfer element 38 is not cooled off by the surrounding liquid L, whereby the dry portion is excessively heated. In the over-saturated portion of the fluid transfer element 38, the temperature is lower and boiling bubbles and projections can be formed. The heat from the vaporizing unit 34 is transferred inside the liquid store 32 and parts of the capsule 16. It is therefore advantageous to avoid formation of local variations and presence of dry areas of the fluid transfer element 38 in contact with the heating element 36.

On the other hand, if the capillary height of the fluid transfer element 38 largely exceeds the height of the heating element 36, the heating element 36 will become oversaturated along its entire axial length and the temperature of the heating element 36 is cooled down rather than achieving an efficient vaporizing the liquid. This may again lead to bubble formation and liquid projections, while the temperature increases in the liquid storage portion 32 and the housing of mouthpiece portion 20. In the typical vaporization process of an electronic cigarette, the vaporization is achieved by boiling of the liquid below the surface of the liquid. If the level of saturation of the heating element 36 is kept at an ideal level, such that the heating element 36 is only covered with a small amount of liquid L, the boiling does not create large projections of liquid, but instead creates a uniform heating of the liquid and enables the liquid to go directly into a vapor state.

It is common to detect the temperature of the heating element 36, as the temperature of the heating element 36 increases when the fluid transfer element 38 gets dry. In the absence of fluid around the heating element 36, the temperature of the heating element 36 increases. This is because fluid present around the heating element 36 absorbs energy from the heating element 36 when it passes into a vaporization state, which results in a cooling effect on the heating element 36. That is to say, heat from the heating element 36 tends to be used to provide the latent heat of vaporization required to transform the liquid into gas at the boiling point temperature, rather than causing the temperature of the heating element 36 and any surrounding material to increase in temperature. By measuring the temperature of the heating element 36, the vaporization temperature can be controlled so that the fluid transfer element 38 is not overly heated.

An ideal vaporization is characterized by a high vapor volume, a minimal amount of heat transferred to the liquid store and a low presence of liquid projections.

A first exemplary prototype was designed based on previously known configurations and relative dimensions of a heater element 36 and fluid transfer element 38 combination. In a first example, the following parameters were selected:

Example 1

Diameter: 0.4 mm
Resistive length: 70 mm
Resistance: 0.294 Ω
Total effective length: 68 mm
Pitch: 0.7 mm
Heating coil height: 4.75 mm
Total effective surface: 85.45 mm2
Power density: 0.187 W/mm2
Convection heated up: 1040 W/m2K
Height of fluid transfer element: 5.8 mm Additionally, liquid inlets to from the fluid transfer element 38 were spread out in the axial direction of the fluid transfer element 38 in order to provide a sufficient liquid supply along the entire length of the heater element 36.

However, the first exemplary capsule provided an unsatisfactory result, despite the sufficient and well distributed liquid supply to the heater element 36 and saturated fluid transfer element 38. The coil presented an inconsistent heating profile, where the lower part of the heating coil reached only up to 300 K and where the upper part of the coil reached up to about 900 K. As the total measurable resistance corresponds to the sum of the resistance over the whole coil length, the temperature could not be regulated on the basis of a resistance measurement, as the temperature was not consistent over the entire coil length.

With a background of the problems of the first example of the coil, the inventors have found that the lower section of the fluid transfer element 38 could be configured with a wetted height $h_w$ as long as there is liquid left in the liquid store 32. The wetted height corresponds to the distance capillary action will take place. The heating element 36 should therefore be relatively short in order to not extend above the upper (dry) section of the fluid transfer element 38. However, the heating element 36 still needs to be configured to produce a satisfying amount of vapor. The fluid transfer element 38 should be supplied with a controlled and consistent amount of liquid. Hence, the liquid supply rate needed to be controlled during the vaporization. The liquid inlets were the bottom of the fluid transfer element 38 forces the liquid to rise in the fluid transfer element 38 by capillary action. This causes a controlled liquid supply to the heater element 36 regardless of the amount of liquid in the liquid store.

Moreover, advantageous dimensions found by the inventors include a height of the fluid transfer element 38 of between 4.5 and 6.5 mm and a height of the heating coil of between 1.8 to 2.5 mm. Preferably the height is 5.8 mm and 2.04 mm respectively.

Preferably, the height of the heating coil 36 in relation to the fluid transfer element is 20-50%, preferably between 25% and 45% and most preferably around 35% of the height of the fluid transfer element 38. The porous material of the fluid transfer element 38 is preferably selected such that the capillary height of the fluid transfer element is equal to the actual height of the fluid transfer element. The capillary height of the fluid transfer element 38 can even exceed the actual height of the fluid transfer element. In this case, we can refer to a theoretical capillary height.

Compared to the first example initial and standard configuration of a heating coil 36 and fluid transfer element 38 configuration, the height of the heating element 36 was reduced to approximately a half of the initial height. The height was reduced to various levels in the different samples. In absolute measures, the height of the heating element (i.e. the heating coil 36) was reduced with at least 3 mm. An advantage having a long wick is that it can retain a reserve of liquid and thus act as a buffer. The wick can is therefore adapted to supply liquid to wick in the heater region, if for instance the electronic cigarette is held upside down. Additionally, as discussed above, the buffer also provides an independent resupply route through the fluid transfer element 38 for resupplying liquid to the portions of the fluid transfer element 38 during a puff even when the electronic cigarette 2 is held in a normal orientation.

The inventors found that the liquid flow from the liquid store 32 needs to be precisely matched to the power density in order to get a high level of vapor production, avoid dry fluid transfer element 38, formation of bubbles and excessive heating of the liquid in the liquid store 32. It was a surprising effect that by increasing the power density, the liquid temperature in the liquid store 32 was found to decrease. During the tests, it was found that by increasing the convection from 1900 W/m$^2$K to 6000 W/m$^2$K, and the power density from 0.187 W/mm2 to 1.152 W/mm2, the temperature in the liquid store was reduced from 108° C. to 54° C. The increased convection and power density were achieved by increasing the resistance of the heating coil by reducing its diameter.

In order to verify the interrelationship of the fluid transfer rate and the power density, a number of capsule prototypes were tested. The target convection of the heating element 36 was found to be between 5000 and 7000 W/m$^2$K, preferably between 5500 W/m$^2$K and 6500 W/m$^2$K and most preferably at 6000 W/m$^2$K.

When the height of the heating element 36 was reduced, the diameter of the heating coil was also reduced in order to obtain the desired convection of 6000 W/m$^2$K. Hence, the height was decreased to further increase the power density of the heating coil for the same amount of power applied to the heating coil. However, it was shown that the heating wire forming the heating coil 36 cannot be permitted to become too thin for two principal reasons: firstly, the coil 36 can become mechanically weak which makes it difficult to assemble and it ceases being able to support the fluid transfer element 38 and prevent its deformation into the main vapor channel 40. This is undesirable as the vapor channel diameter is an important parameter affecting device performance and it is therefore important to have consistent control over this parameter which is difficult to achieve if the fluid transfer element 38 is partially blocking the vapor channel, and secondly, as the heating wire becomes thinner the effect of manufacturing tolerances in the wire thickness have a greater impact and some portions of the wire can become very thin—these portions are then at risk of overheating relative to other portions of the wire and possibly fusing.

In order to reduce the height and still achieve the same power density, the coil diameter was nonetheless reduced and different values were assessed. The optimum coil diameter was then selected from among the values 0.4, 0.3, 0.254 and 0.226 mm.

The result of the assessment was that an optimized capsule as per Example 2, which could have:

Example 2

Diameter: between 0.226 and 0.3 mm, preferably 0.254 mm
Resistive length: 26.92 mm
Resistance: between 0.291 to 0.295 Ω
Total effective length: 26.09 mm
Pitch: between 0.5-1.0 mm, preferably 1.0 mm
Heating coil height: between 2.4-3.2 mm
Total effective surface: 20.82 mm2
Power density: between 1.152 to 2.319 Watt/mm2, preferably 1.152 Watt/mm2
Convection heated up: between 5000 and 7000 W/m$^2$K, preferably around 6000 W/m$^2$K, W/m2K
Height of fluid transfer element: between 4.5 and 6.5 mm, preferably 5.8 mm mm
Capillary height of the fluid transfer element: same or exceeding the actual height of the fluid transfer element
Sealing type: Shown that a non-circular seal with larger height than width was the most advantageous to maintain a negative pressure in the liquid store 32.

The optimum pitch of the windings was found to be with in a preferred range of between 0.5-1.0 mm to ensure a satisfactory heat distribution.

The target heating temperature for the second exemplary capsule was the same as for the first exemplary capsules, which was 270° C.

It was also found that the number of windings of the heating coil 36 should preferably be between 2 and 4, and most preferably 3. Having a number of windings between 2 and 4 provide a heating coil 36 that is less flimsy and can better hold together in the manufacturing process of the heating coil 36. Additionally, having three coil windings is very efficient in terms of the resupply routes of the liquid to the portions of the fluid transfer element 38 in contact with the heating element 36. In particular, there is a direct path radially through the liquid inlets 48 towards the centre coil of the heater. Additionally, some liquid from the liquid inlets 48 can travel downwards towards the bottom coil winding of the heating element 36. Simultaneously a minor resupply route is provided from the portion of the fluid transfer element 38 immediately below the bottom coil. A major resupply route is from the portion of the fluid transfer element above the top coil to the portion of the fluid transfer element in contact with the top coil of the heating element 36. Only a small amount of liquid from the liquid inlets will travel upwards to re-supply this portion as it is mostly resupplying the liquid vaporized by the middle and lower coil windings, so most of the resupply liquid comes from the buffer portion above the top coil winding. This is then resupplied by capillary action in-between puffs.

An advantage of having a fluid transfer element 38 having a height greater than the heating element 36 and also having a correspondingly high capillary height is that the size of the liquid inlets 48 can be minimized as the liquid inlets can be configured such that they only need to resupply a portion of the liquid being vaporized during a puff as the liquid in the fluid transfer element 38 can supplement liquid passing through the liquid inlet(s) 48 for resupplying vaporized liquid during a puff. Naturally, the size of the liquid inlets needs to be determined in view of the viscosity of the liquid to be used in the liquid store 32. The dimensions in this embodiment are chosen to be optimal for use with liquid comprising mostly a mixture of Vegetable Glycerin (VG) and Propylene Glycol (PG) with ratios of between 40 and 60% (i.e. ranging from VG:PG=40:60 to VG:PG=60:40). The dimensions of the inlets would naturally be increased slightly if using higher proportions of VG (e.g. up to substantially 100% VG and no PG) due to the greater viscosity of VG compared to PG.

Figure 5:
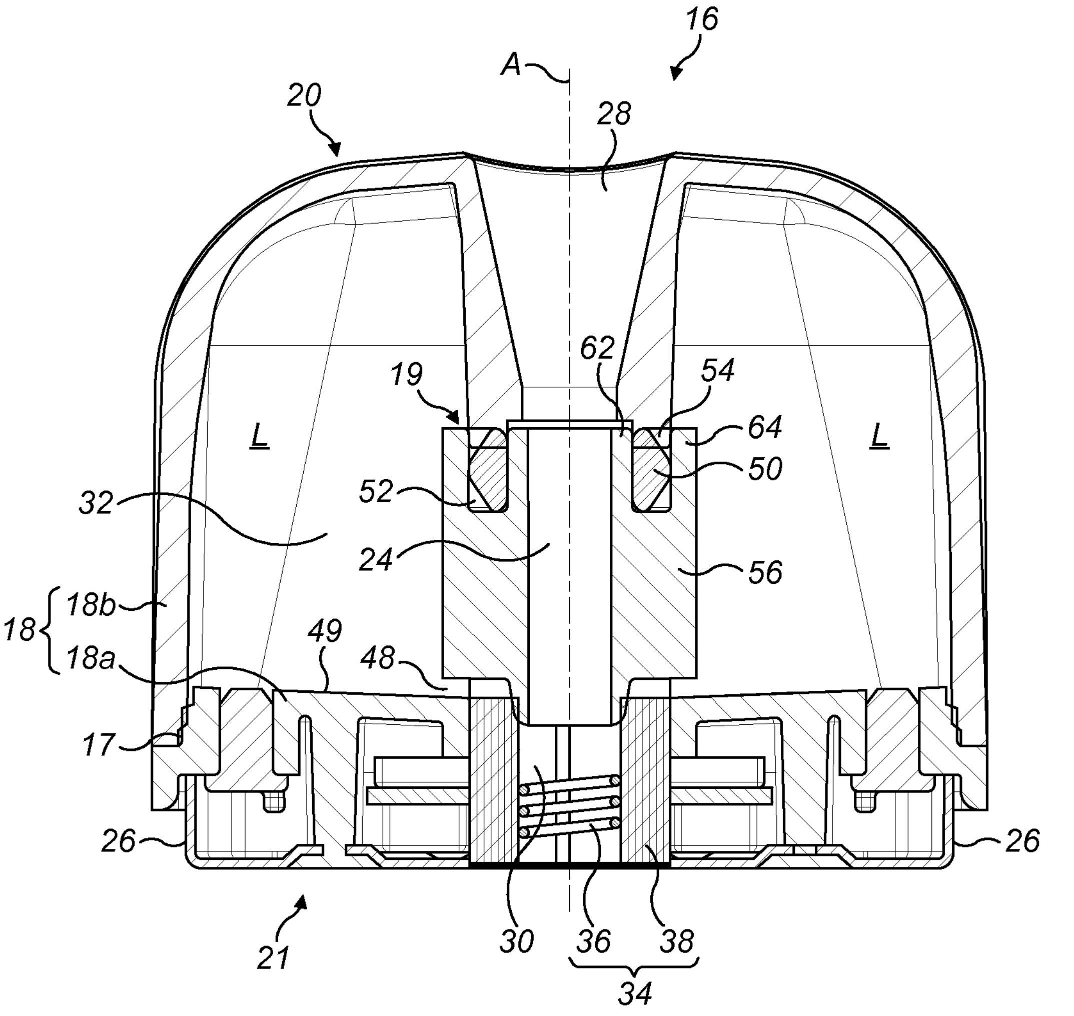
FIG. 5 is a cross-sectional view of a capsule in an embodiment of the invention.

FIG. 5 is a cross-sectional view of a capsule 16 in another embodiment of the invention. The capsule 16 differs from the arrangement shown in FIG. 2A in the position of the vaporisation chamber 30. In this arrangement the vaporisation chamber 30 is positioned entirely below the liquid store 32. Liquid inlets 48 are provided in the base of the liquid store 32, fluidly connecting the liquid store 32 with the fluid transfer element 36. The capillary action in the fluid transfer element 36, together with the downward force of gravity, can encourage liquid in the liquid store 32 to flow into the fluid transfer element 36. The flow of liquid is regulated in this arrangement by a negative pressure that forms in the liquid store 32 when the liquid is drained. The heating coil 36 includes three coils in this arrangement, and it is provided radially inwardly of the fluid transfer element 38.

The skilled person will realize that the present invention by no means is limited to the described exemplary embodiments. The mere fact that certain measures are recited in mutually different dependent claims does not indicate that a combination of these measures cannot be used to advantage. Moreover, the expression "comprising" does not exclude other elements or steps. Other non-limiting expressions include that "a" or "an" does not exclude a plurality and that a single unit may fulfill the functions of several means. Any reference signs in the claims should not be construed as limiting the scope. Finally, while the invention has been illustrated in detail in the drawings and in the foregoing description, such illustration and description is considered illustrative or exemplary and not restrictive; the invention is not limited to the disclosed embodiments.

The invention claimed is:

1. A capsule for an electronic cigarette, the capsule having a first end for engaging with an electronic cigarette device and a second end configured as a mouthpiece portion having a vapor outlet, the capsule further comprising:
a liquid store configured to contain a liquid to be vaporized,
a vaporizing unit comprising a heater and a fluid transfer element, the vaporizing unit being arranged within a vaporizing chamber,
a main vapor channel extending from the vaporizing chamber to the vapor outlet in the mouthpiece portion, and
a housing comprising an inner housing and an outer housing, the housing enclosing the liquid store and the vaporizing unit,
wherein the inner housing comprises a first shoulder and a second shoulder which define a circular groove there-between, wherein the outer housing comprises a projection configured to extend into the circular groove when the inner housing and the outer housing are assembled together, wherein the liquid store is located in a void in-between the inner housing and the outer housing, wherein a seal is provided inside the circular groove between the inner housing and the outer housing, and wherein the seal has a cross-sectional shape having a cross-sectional height that is larger than a cross-sectional width thereof.

2. The capsule according to claim 1, wherein the fluid transfer element is fluidly connected to the liquid store by at least one liquid inlet and the fluid transfer element provides a capillary action on liquid received therein, wherein the heater is provided at a position that is substantially adjacent the at least one liquid inlet, or at a position between the at least one liquid inlet and the mouthpiece portion.

3. The capsule according to claim 2, wherein the fluid transfer element is located within the main vapor channel and has a longitudinal component coinciding with a longitudinal axis of the capsule, whereby the capillary action on liquid in the fluid transfer element is towards the mouthpiece portion, thereby regulating a flow of liquid from the liquid store to the fluid transfer element.

4. The capsule according to claim 2, wherein the at least one liquid inlet is provided at a bottom of the fluid transfer element, in use, at a distance of 0-1 mm from the bottom of the fluid transfer element.

5. The capsule according to claim 2, wherein the at least one liquid inlet has a diameter of between 0.8 to 1.3 mm.

6. The capsule according to claim 1, wherein the inner housing and the outer housing are assembled using a first joint and a second joint, wherein the second joint is located radially inwardly of the first joint, and wherein the second joint enables a movement between the inner housing and the outer housing in an axial direction of the capsule such that a relative axial position of the inner housing and the outer housing can be varied.

7. The capsule according to claim 6, wherein the outer housing has a protrusion that is configured to extend into the groove at a variable depth.

8. The capsule according to claim 1, wherein the cross-sectional shape of the seal is oval.

9. The capsule according to claim 1, wherein the cross-sectional shape of the seal has a transversal projection, projecting in a direction transverse to an axial compressible direction of the seal, wherein the transversal projection is configured to seal against the inner housing or the outer housing once a compression threshold has been reached.

10. The capsule according to claim 1, wherein the fluid transfer element has a hollow tubular shape and the heater is in the form of a heating coil and arranged radially inward of the fluid transfer element.

11. The capsule according to claim 10, wherein a capillary height of the fluid transfer element exceeds an axial height of the heating coil.

12. The capsule according to claim 10, wherein the heating coil has a height corresponding to 25%-50% of a height of the fluid transfer element.

13. The capsule according to claim 12, wherein the fluid transfer element has a capillary height corresponding to the actual height of the fluid transfer element.

14. The capsule according to claim 12, wherein the height of the fluid transfer element is between 4.5 and 6.5 mm and the height of the heating coil is 1.8 to 2.5 mm.

15. The capsule according to claim 1, wherein a convection of the heater is between 4000 and 7000 W/m2K and a power density of the heater is between 1.10 to 2.350 Watt/mm2.

16. The capsule according to claim 2, wherein the at least one liquid inlet has a diameter of between 0.95 and 1.15.

17. The capsule according to claim 2, wherein the at least one liquid inlet has a diameter of between 1.03 and 1.14 mm.

18. The capsule according to claim 12, wherein the height of the fluid transfer element is 5.8 mm and the height of the heating coil is 2.04 mm.

19. The capsule according to claim 10, wherein the heating coil has a height corresponding to 35% of a height of the fluid transfer element.

20. The capsule according to claim 1, wherein a convection of the heater is between 4000 and 7000 W/m2K and a power density of the heater is between 1.15 to 1.16 Watt/mm2.

* * * * *